(No Model.)
F. GETZ.
SEED DRILL.
No. 266,805. Patented Oct. 31, 1882.
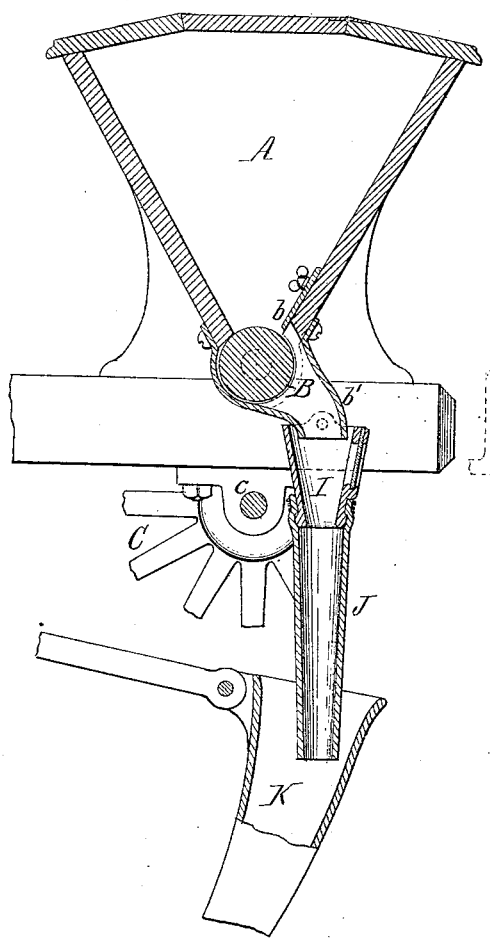
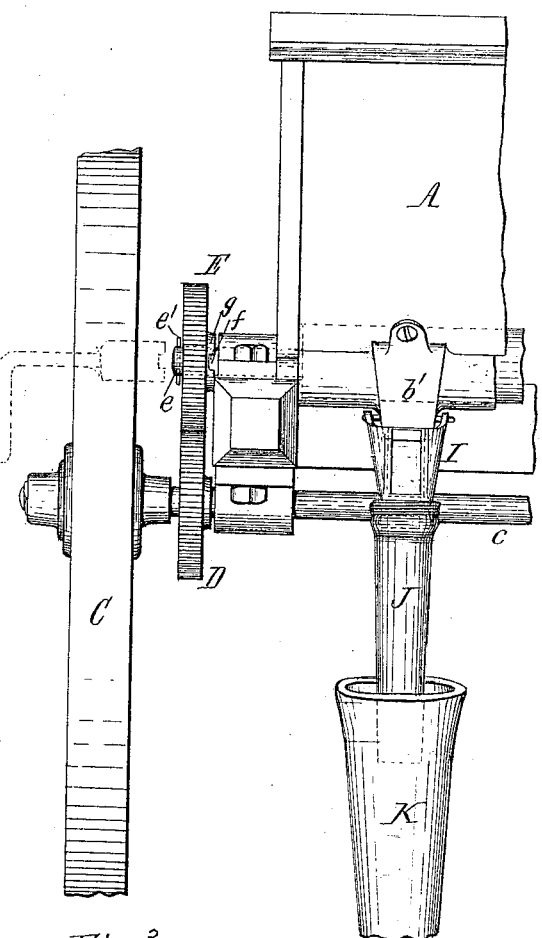
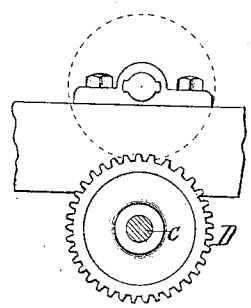
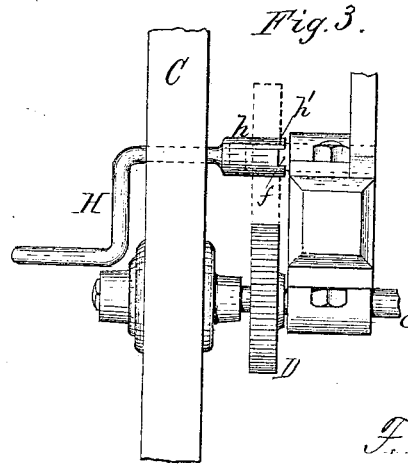
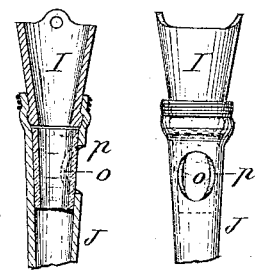
Witnesses: Chas. J. Buchheit, Edw. J. Brady
F. Getz, Inventor.
By Wilhelm & Bonner, Attorneys.

UNITED STATES PATENT OFFICE.

FRANKLIN GETZ, OF TONAWANDA, NEW YORK.

SEED-DRILL.

SPECIFICATION forming part of Letters Patent No. 266,805, dated October 31, 1882.

Application filed January 24, 1882. (No model.)

*To all whom it may concern:*

Be it known that I, FRANKLIN GETZ, of Tonawanda, in the county of Niagara and State of New York, have invented a new and useful Improvement in Seed-Drills, of which the following is a specification.

This invention has reference to certain improvements in seed-drills, whereby the grain contained in the seed-hopper can be fully discharged therefrom when required while the machine remains stationary, and whereby the flow of the grain through the tubes which conduct it to the drill-teeth can be readily observed.

It often occurs in the practical use of seed-drills that a quantity of grain or seed remains in the hopper after the land has been completely sowed, and it becomes in such case desirable to discharge the grain from the hopper without sowing it.

My invention consists to that end in means whereby the feed roller or cylinder can be rotated independently of its driving mechanism, so as to discharge the grain from the hopper without moving the machine; and it also consists in transparent tubes arranged in the flexible tubes through which the grain flows from the seed-hopper into the drill-teeth, through which the flow of grain can be observed by the operator walking behind the machine, as will be hereinafter more fully set forth.

In the accompanying drawings, Figure 1 is a sectional fragmentary elevation of a seed-drill provided with my improvements. Fig. 2 is a rear elevation thereof. Fig. 3 is a rear elevation, showing the crank in place, whereby the feed-roller is rotated independent of its driving mechanism. Fig. 4 is an end view of the shaft of the feed-roller and the gear-wheel whereby it is rotated. Fig. 5 is a vertical section; and Fig. 6 is a rear elevation, showing the manner of securing the transparent tubes in the grain-passages.

Like letters of reference refer to like parts in the several figures.

A represents the seed-hopper, B the feed roller or cylinder arranged in the bottom opening of the feed-hopper, $b$ the feed-slide whereby the discharge of grain is regulated, and $b'$ the tubes through which the grain is discharged from the feed-hopper, all constructed and operating in a well-known manner.

C represents one of the wheels on which the machine is supported, and $c$ the axle to which the wheels are secured.

D represents a gear-wheel mounted on the axle $c$ and meshing with a gear-wheel, E, which is removably attached to the shaft $e$ of the feed-roller B by means of a pin, $e'$, or other suitable means. The end of the shaft $e$ is constructed with teeth or projections $f$, and the hub of the gear-wheel E with similar teeth or projections, $g$, which project into the spaces between the teeth $f$ in the manner of a clutch-coupling, whereby the motion of the wheel E is transmitted to the feed-roller.

H represents a hand-crank, provided with a hollow sleeve, $h$, which fits on the end of the shaft $e$, and which is provided with projections $h'$, which fit between the teeth $f$ of the shaft $e$, so that by applying the crank H to the end of the shaft $e$, after the wheel E has been removed therefrom, the shaft $e$ can be turned by means of the crank H. By so turning the crank $e$ the grain or seed contained in the hopper A is discharged therefrom through the grain-tubes without moving the machine, and by placing bags under the drill-teeth the grain can be collected. In this manner the seed-hopper is quickly emptied and made ready to receive a different kind of grain or seed, if desired.

I represents a short tube or sleeve, which is hung to each grain-tube $b'$, and J the flexible tube, which is attached to the sleeve I and serves to conduct the grain to the hollow drill-tooth K. As represented in Figs. 5 and 6, a short glass tube, $o$, is secured in the upper portion of the flexible tube J, the latter being provided in its rear side with an opening, $p$, which is covered by the glass tube $o$. By this means the flow of grain from the seed-hopper into the teeth of the drill can be readily observed by the person walking behind the machine, which is very difficult, if not impossible, in ordinary grain-drills, especially when guano is sown simultaneously with the seed or grain.

I claim as my invention—

1. In a seed-drill, the combination, with a seed-hopper, A, and the feed-roller B, which is connected with the wheels of the machine by driving mechanism constructed to be thrown in and out of gear at desire, of a removable hand-crank, which can be applied to the feed-roller when its driving mechanism is thrown out of gear, and whereby the feed-roller can be rotated without moving or lifting the machine to discharge the grain contained in the seed-hopper, substantially as set forth.

2. The combination, with the flexible grain-tubes J, provided on their rear sides with openings $p$, of glass tubes $o$, secured within the flexible grain-tubes to cover the openings $p$, substantially as set forth.

FRANKLIN GETZ.

Witnesses:
 JNO. J. BONNER,
 EDW. J. BRADY.